United States Patent [19]

Gross

[11] 4,031,431

[45] June 21, 1977

[54] GROUND FAULT CIRCUIT INTERRUPTER

[75] Inventor: Thomas A. O. Gross, Lincoln, Mass.

[73] Assignee: The Gillette Company, Boston, Mass.

[22] Filed: Oct. 1, 1975

[21] Appl. No.: 618,567

[52] U.S. Cl. ............................. 307/326; 324/133; 361/42

[51] Int. Cl.² ......................................... H02H 3/28

[58] Field of Search ............ 317/18 D, 18 A, 18 B, 317/18 R, 48, 335 C, 47, 9 AC, 9 A, 9 R; 324/133, 51, 66, 82; 340/258 C, 253 H, 253 N, 255, 248 R; 307/92, 94

[56] References Cited

UNITED STATES PATENTS

| 2,474,407 | 6/1949 | Todd et al. | 324/133 |
|---|---|---|---|
| 3,312,862 | 4/1967 | Currin | 317/10 |
| 3,437,928 | 4/1969 | Baker et al. | 324/133 |
| 3,525,019 | 8/1970 | Lansch | 317/27 |
| 3,617,808 | 11/1971 | Yoder | 317/18 D |
| 3,766,434 | 10/1973 | Sherman | 317/18 A |
| 3,828,256 | 8/1974 | Liu | 324/133 |
| 3,857,096 | 12/1974 | Gregory | 324/133 X |
| 3,932,790 | 1/1976 | Muchnick | 317/18 D |

Primary Examiner—Donovan F. Duggan
Assistant Examiner—Patrick R. Salce
Attorney, Agent, or Firm—Richard A. Wise; Oistein J. Bratlie; Raymond J. Devellis

[57] ABSTRACT

Apparatus including polarity sensing means and a switch such as a Triac for providing a ground fault circuit interrupter system for an electrical load such as a hand-held appliance. The Triac is electrically connected in a completed circuit with the electrical load and is positively positioned in series with the line conductor of an A.C. power source. Automatic testing circuitry such as introducing synthetic and counterbalancing synthetic faults to the system is included.

18 Claims, 2 Drawing Figures

GROUND FAULT CIRCUIT INTERRUPTER

BACKGROUND OF THE INVENTION

This invention relates to electrocution proof devices such as ground fault circuit interrupter systems for use in protecting the operator of apparatus such as an appliance or tool.

More particularly, this invention relates to circuitry which is fail-safe and provides protection to the operator of a portable hand-held appliance or tool such as a hair dryer, styling wand, etc. from a predetermined current level introduced when a fault occurs.

Ground fault circuit interrupter systems are intended to sense small differences in current in normally balanced power lines or cables. These differences may be caused by a leakage of current from one of the line conductors to ground, thus depriving the return line of some of its normal current which would establish a balance zero difference in current at the sensor. As long as the difference current is below a predetermined level, typically about 0.005 ampere, power should normally be allowed to flow uninterrupted. If a larger difference current occurs, the circuit should be interrupted since it is then probable that a malfunction of insulation or perhaps a serious shock to a human being is occurring.

In the past, portable ground fault circuit breakers treated both the hot or line conductor and the neutral or ground conductor symmetrically, i.e. interrupted both conductors whenever a fault was present.

The interruption of current in both conductors was necessary in the case of a portable appliance since it was not known which of the conductors was electrically connected to the line or "hot" side of the receptacle.

Attempts to construct fail-safe circuit interrupter systems for portable appliances utilizing solid state technology and at a reasonable cost have also in the past encountered various difficulties. For example, solid state switching elements such as Triacs have the safety disadvantage that they tend to fail as a short thereby creating an unacceptable risk to the operator of the appliance. In any event, although solid state switches overcome many inherent disadvantages of mechanical switches, e.g. arcing, corrosion, size, etc., prior art approaches using such solid state technology still required solid state switching elements in both the line conductor side and the neutral conductor side of the system along with additional control circuitry. The need for fault protection on both the neutral and line conductor sides is due to the ground ambiguity problem. This adds to the cost and complexity of the system.

More particularly, in a normally wired house one of the conductors from the alternating current power source is generally grounded and referred to as a ground or neutral conductor and the other conductors are electrified with varying voltages with respect to it and called the line or hot conductors. Prior art approaches for protecting the operator of a portable appliance with an integral ground fault circuit interrupter required the interruption of both the line and the neutral conductors in the presence of a fault since, unless permanently wired, there was no practical way to tell which side of the A.C. receptacle was hot. Interrupting both conductors appeared to be the only practicle way to handle a portable appliance ground fault situation since it was not readily acertainable what was the polarity of the A.C. power source. Prior polarity sensors did not provide hot side interruption when improperly connected. Further, even if an operator knew conventional wiring procedures, such an educated guess would be dangerous since many older homes were wired without regard for polarity convention.

With the cost conscience manufacturing of appliances, tools, and the like it is desirable to avoid the cost and complexity of prior switching schemes which interrupted both conductors in the presence of a fault. Thus, it is desirable to develop a system which is fail-safe and comprises a single switching element which would be plugged into an A.C. receptable by an operator in a manner which necessitates the single switching element being connected in series with the line conductor. Other safeguards would be included to provide an operator with a fail-safe electrocution proof appliance.

SUMMARY OF THE INVENTION

It is an object of this invention to provide apparatus such as a portable appliance or tool with ground fault circuit interrupter protection in a cost effective and reliable manner.

It is another object of this invention to provide a ground fault circuit interrupter system which is self-testing and indicates whether or not it is correctly electrically coupled to a source of alternating current.

It is a further object of this invention to provide a system for detecting ground faults which is solid state in nature and cost effective but provides fail-safe operation.

Briefly stated, and according to an aspect of this invention, a ground fault circuit interrupter system is provided for protecting an operator of an appliance from electrical hazards by providing a plug assembly with a single solid state switch. The system indicates to the operator whether or not the solid state switch is connected in series with the line conductor side of the A.C. power source. Further, the solid state switch is preferably permanently connected in a completed circuit to the electrical load of the appliance and when the appliance is utilized in its normal manner, the components of the system are automatically tested.

BRIEF DESCRIPTION OF THE DRAWINGS

The invention both as to its organization and principles of operation, together with further objects and advantages thereof, may better be understood by referrring to the following detailed description of an embodiment of the invention taken in conjunction with the accompanying drawings in which.

DETAILED DESCRIPTION

Figure 1:
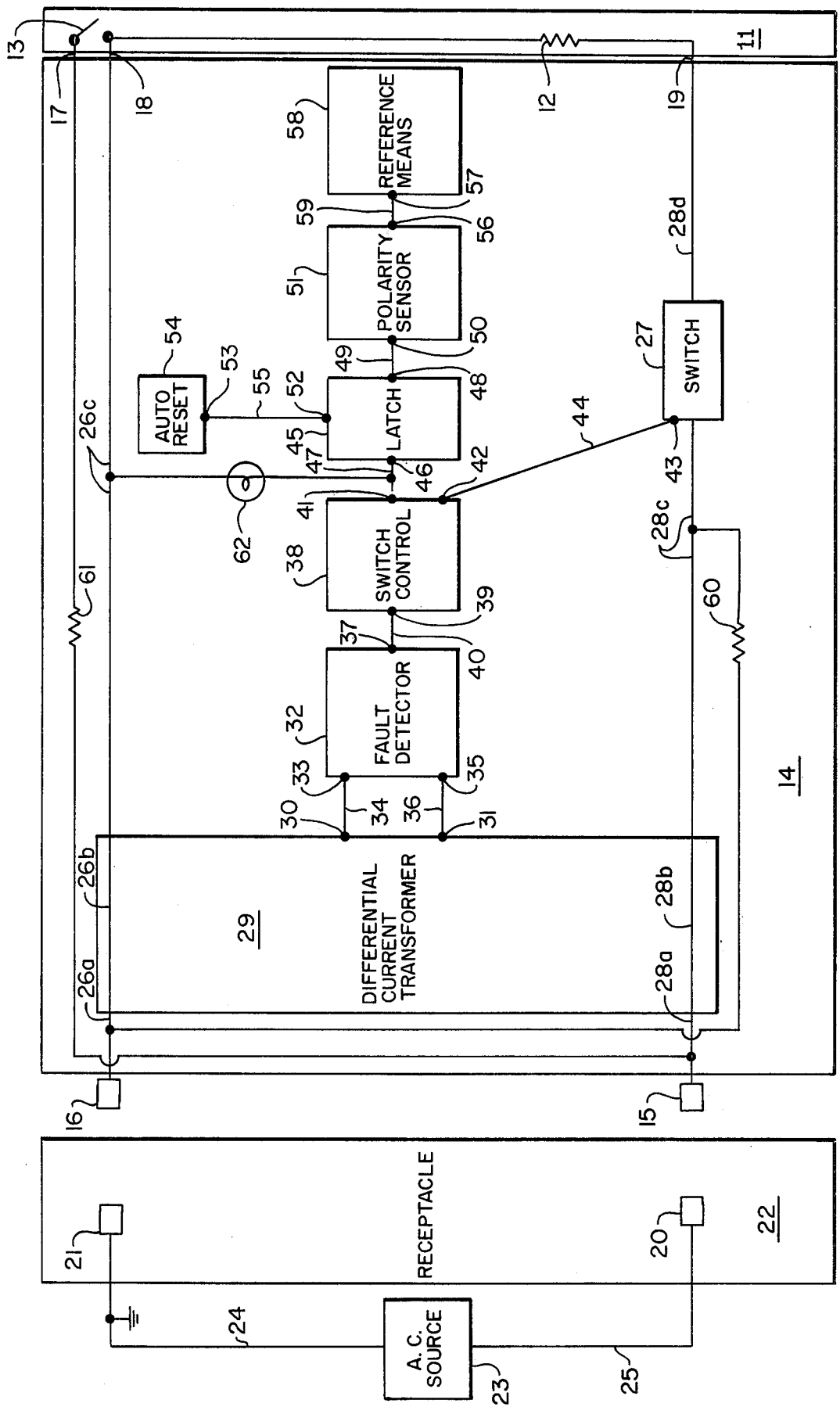
FIG. 1 is a block diagram, illustrating an embodiment of the ground fault circuit interrupter system, in accordance with this invention.

The present invention is directed to ground fault circuit interrupter systems which are used to protect the operator of apparatus having an electrical load. The type of apparatus is unimportant although in a preferred embodiment the apparatus is a portable hand-held appliance of tool 11. The appliance 11 includes within its housing an electrical load 12 and an on/off switch 13 shown in its open or "off" position.

A plug assembly 14 having a first plug blade 15 and a second plug blade 16 is electrically connected to the appliance 11 through electrical conductors 17, 18, and 19. First and second plug blade 15 and 16 extend from the housing of the plug assembly 14 and are positioned respectively in line with potential mating first terminal portion 20 and second terminal portion 21 of A.C. receptacle 22. The receptacle 22 is typical of modern day electrical wall outlets.

An alternating current power source 23 such as a conventional 60 hertz 120 volts service has its ground or neutral side electrically connected to the second terminal 21 through neutral conductor 24. The line or hot side of the source 23 is electrically connected to the first terminal 20 through line conductor 25. Although the upper conductor 24 of FIG. 1 is illustrated as being the ground or neutral conductor, the conductor electrically connected to the ground side of the A.C. source 23, it is illustrated as such for the sake of convenience only since the location of the ground side is typically ambiguous.

When plug blade 16 is electrically coupled to terminal portion 21 and plug blade 15 is electrically coupled to terminal portion 20, the plug assembly 14 is correctly connected to the A.C. receptacle 22. Conversely, when the plug blade 16 is electrically coupled to terminal portion 20 and plug blade 15 is electrically coupled to terminal portion 21, the plug assembly 14 is incorrectly connected to the A.C. receptacle 22.

Conductor 18 which is electrically connected to a first end of the electrical load 12 of the appliance 11 is also electrically connected in series to plug blade 16 through an upper conductor 26 in plug assembly 14 and includes conductor portions 26a through 26c. Likewise, conductor 19 which is electrically connected to a second end of the electrical load 12 of the appliance 11 is also electrically connected in series to plug blade 15 through a switch assembly 27 and a lower conductor 28 all in plug assembly 14 and lower conductor 28 includes conductor portions 28a through 28d.

Disposed about conductor portions 26b and 28b and in the plug assembly 14 is a differential current transformer means 29 which senses the current passing through conductor portions 26b and 28b and produces a difference signal indicative of the difference thereof at its output or secondary designated as first and second output terminals 30 and 31.

A fault detector circuit 32 is electrically connected at its first input terminal 33 to the first output terminal 30 of transformer 29 through conductor 34 and at its second input terminal 35 to the second output terminal 31 of transformer 29 through conductor 36. The fault detector circuit 32 provides an output signal indicative of, or proportional to, the difference signal produced by the transformer 29 and provides at its output terminal 37 a fault signal when the difference signal is at or above a predetermined level.

A switch control circuit 38 is electrically connected at its first input terminal 39 to the output terminal 37 of the fault detector circuit 32 through conductor 40. The switch control circuit 38 also includes a second input terminal 41 which is adapted to receive an enabling signal to be explained subsequently and an output terminal 42 electrically connected to gate input 43 of the switch assembly 27 through conductor 44. The switch control circuit 38 requires that the enabling signal be present at input terminal 41 and that there is no fault signal present at input signal terminal 39 before the switch control circuit 38 produces a control signal at its output 42 to control the state of switch assembly 27.

The switch assembly 27 which is electrically connected between conductor portions 28c and 28d is preferably in the form of a solid state or semiconductor switching element such as a Triac which provides the current in conductor 28 when the control signal from switch control circuit 38 is present.

A latching circuit 45 has its output terminal 46 electrically connected to the second input terminal 41 of switch control circuit 38 through conductor 47 to provide the enabling signal to switch control circuit 38. The latching circuit 45 also includes a first input terminal 48 electrically connected through conductor 49 to an output terminal 50 of a polarity sensor of polarity sensing circuit 51 to be explained subsequently. A second input terminal 52 of latching circuit 45 is electrically connected to an output terminal 53 of automatic reset circuitry 54 through conductor 55.

An input terminal 56 of the polarity sensing circuit 51 is electrically coupled to an output terminal 57 of a reference means 58 through conductor 59. The polarity sensor 51 may include a comparator such as a high input impedance amplifier having a first input terminal such as input terminal 56 electrically coupled to an output terminal such as output terminal 57, of reference means 58 for receiving a first signal of a predetermined reference range and a second terminal (not shown) which is electrically coupled to a second reference signal source such as conductor portions 28a through 28c. In any event, the output of the comparator should produce an output signal when the output signal range of the reference means 58 and that of the second reference signal are at a predetermined difference thereby indicating to the latching circuit 45 that an enabling signal should be transmitted to the switch control circuit 38. As will be apparent, the switch 27 should only be enabled when the switch 27 of plug assembly 14 is correctly electrically connected in series with the line conductor 25.

Electrically connected to conductor portion 26a and conductor portion 28c is means for introducing a synthetic fault in the form of resistor 60. Electrically connected between conductor portion 28a and conductor 17, which is in turn electrically connected to the on/off switch 13 of the appliance 11, is means for introducing a counterbalancing synthetic fault in the form of resistor 61. Thus, when on/off switch 13 is in its off or "open" state (as shown in FIG. 1) only resistor 60 is electrically in a completed circuit. When on/off switch 13 is in its on or "closed" state, resistor 61 is added in the completed circuit.

Still referring to FIG. 1, electrically connected to conductor 47 between the switch control circuit 38 and the latching circuit 45 and to conductor portion 26c is an indicating means such as bulb 62 for indicating when the enabling signal has been generated by the latching circuit 47 to indicate that switch assembly 27 is in series with the line conductor 25 and that the plug assembly 14 is correctly connected to the A.C. receptacle 22.

Referring generally to the plug assembly 14, it is believed evident that to protect an operator of the appliance 11 from faults occurring in both the appliance 11 and its line cord (the line cord includes conductors 17, 18, and 19) the switch assembly 27 must be located as close to the A.C. receptacle 22 as possible. This is accomplished in the embodiment of FIG. 1 by locating the switch assembly 27 in the plug assembly 14. However, it is considered to be in the scope of this invention to locate the switch assembly 27 otherwise such as in the housing of the appliance itself. Thus, the term electrical load as used herein is meant to encompass the electrical load associated with that of the appliance per se with or without the associated line cord depending upon the positioning of the switch assembly 27.

Although FIG. 1 illustrates most of the circuit components located in the plug assembly 14 at the far end of the appliance 11, it is also believed evident that these components may be located in the housing or the like of the appliance or in a separate housing positioned between the A.C. receptacle and the typical plug of an appliance.

There are a plurality of ways in which to indicate that the switch assembly 27 is indeed electrically connected in series with the line conductor 25 other than the indicator light 62 shown in FIG. 1. Light 62 gives such an indication since an enabling signal appears at the output terminal 46 of the latching circuit 45 only when the plug blades 16 and 15 of the plug assembly 14 are correctly electrically connected to terminal portions 21 and 20 respectively of the A.C. receptacle 22. In fact, in the embodiment of FIG. 1, even if in the indicator light 62 was omitted, means for indicating that the switch assembly 27 is electrically connected in series with the line conductor 25 is present in that the appliance 11 would not operate unless the plug assembly 14 was correctly connected to the A.C. receptacle 22.

Another advantage with the FIG. 1 embodiment is that when the plug assembly 14 is correctly connected, the switch assembly 27, which in a preferred embodiment is a Triac, is always electrically connected in series between the line conductor 25 and the electrical load 12 of the appliance 11 in a completed circuit. What this achieves is that the Triac is always under load and if the Triac fails, having the load always across the Triac acts as a self-test of its operability. That is, if the operator cannot shut the appliance 11 off by means of the on/off switch 13, it becomes evident that the Traic may be malfunctioning. Thus, the Triac is continuously monitored as to its operability.

An additional reason for keeping the switch assembly 27 under the continuous electrical load 12 of the appliance 11 is that in the event a Triac fault such as a current leak occurs, the electrical load 12 helps direct the current therethrough versus a path through the human body. Thus, in effect a substantial current divider is provided to further protect the operator from an electrocution hazard. More specifically, since the resistance of the human body can be as low as 10,000 ohms and the electrical load such as electrical load 12 of appliance 11 is typically in the range of 8 to 100 ohms, it will be appreciated that the configuration as illustrated in FIG. 1 will have the further advantage of adding safety to the system by means of its current dividing properties.

Assuming the switch assembly 27 is in the form of a Triac, which typically fails as a short and may result in an appliance which could not be shut off even though a potential leak is occurring, such leakage of the Triac would be substantially dissipated because of the current dividing properites of the system. Thus, if a severe leakage problem in the Triac occurs, it will not develop potentially lethal voltages (e.g. greater than 5 volts) across the electrical load 12 which in a preferred embodiment is permanently connected to the Triac. For example, if the load is 10 ohms, the Triac leakage can be 500 ma. The dissipation of the Triac in this "off" mode will be (120-5) volts × 0.5 amps = 57.5 watts which is much larger than the "on" dissipation 1 volt × 11.5 amps = 11.5 watts. The Triac will self-destuct or a series connected thermal fuse may be arranged to shut down the unit permanently.

If the electrical load is at the low end of the power spectrum, e.g. 160 ohms, the tolerable steady-state leakage is approximately 50 ma. corresponding to 5.5 watts. The lower dissipation has the same high ratio to the "on" dissipation which for 100 ohms is 1.15 watts. On each case a leakage current which exceeds a load voltage of 5 volts is accompanied by rapid destruction or fusing.

A further built-in test to check on the operability of the circuitry in the plug assembly 14 is an automatic testing which occurs whenever the on/of switch 13 is turned on. As is illustrated in FIG. 1, regardless of the state of the on/off switch 13 of the appliance 11, a synthetic fault caused by resistor 60 is introduced to the system. When the on/off swtich 13 is in its on or "closed" state a second counterbalancing synthetic fault caused by resistor 61 is electrically introduced in the system if operating properly. Thus, if the circuitry contained in plug assembly 14 is not operating properly, the appliance 11 will keep running when the on/off switch 13 is in an off or "open" state thus indicating a malfunction. An adjustable switch may be substituted for the on/off switch 13 in the appliance 11.

Speaking more particularly of the polarity sensor junction or polarity sensing circuit 51, this invention encompasses the use of any means for sensing the polarity (hot side) of an A.C. source to provide ground fault circuit interrupter protection to an operator of a portable appliance. An embodiment of a polarity sensor includes a comparator having a first and second input and an output. A comparator in a preferred embodiment takes the form of a high input impedance amplifier. The second terminal of the amplifier is electrically connected to a conductor which when the plug assembly is correctly connected is electrically connected in series to the hot or line conductor of an associated A.C. source to indicate a predetermined signal such as 120 volts. When this occurs and if the first input terminal of the amplifier receives a known reference signal such as caused by capacitive, resistive, or inductive (i.e. impedance) coupling or preferable to a signal produced by the touch of the human body the proper output signal is realized. The human body which is relatively closely coupled to ground may contact the first input terminal while electrical contact is made between the plug assembly 14 and the A.C. source 23 by means of a touch plate or the like such as during the connecting of the plug assembly to the A.C. receptacle. The touch plate is constructed of a conductive material or metal such as copper and may be positioned somewhere on the exterior of the plug assembly 14 in a location readily and easily accessible to the operator. It has been determined that using the signals from the human body is a most reliable means for introducing a predetermined reference signal range to the polarity sensor. It is considered in the scope of this invention to utilize other means for introducing a known reference signal range either integrally connected with the circuitry in the plug assembly 14 or distant therefrom to practice this invention.

Another embodiment of the comparator for use in the polarity sensing circuit would be to have the second terminal of the comparator electrically connected to a location other than the line conductor such as the neutral or ground conductor. Of course, if the first input terminal of the comparator receives signals from the human body the difference between the signals will not be as great as when the signals from the line conductor are used.

More specifically, assuming the polarity sensor is electrically in the form of a high input impedance amplifier and has its first input terminal electrically coupled to the human body, the difference between the hot conductor and the reference signal (near ground) will produce a relatively large signal which may readily be sensed by the latching circuitry and interpreted as an enabling signal to the switch control circuit 38. This would indicate that the plug assembly 14 is correctly connected and the switch assembly 27 is indeed connected in series with the line conductor 25.

If in fact the plug assembly 14 is incorrectly connected to the A.C. receptacle 22, i.e. the switch assembly 27 is electrically connected in series with the ground or neutral conductor 24, then the output signal from the amplifier (assuming the human body is again utilized as being electrically coupled through a first input through a touch switch) will produce a relatively small signal and not ultimately produce the enabling signal thereby indicating to the operator that the plug assembly 14 is not correctly connected to the A.C. receptacle.

When the proper output signal from the polarity sensor 51 arrives at the input terminal 48 of the latching circuit 45, the latching circuit 45 is latched (activated) and the switch control circuit 38 is enabled. Once the latching circuit 45 is activated, i.e. the proper signal is received from the output of the polarity sensor 51 and the latching circuit 45 indeed causes the switch control circuit 38 to latch, the control of the operation of the appliance 11 is entirely by means of the on/off switch 13. Of course, if later a fault occurs and the switch assembly opens, the appliance 11 will not be able to be turned on by the operator since a dangerous condition occurs. If a power failure occurs at the A.C. receptacle 22, the latching circuit 45 is reset (disabled) through the automatic reset circuitry 54 in a manner described subsequently.

The switch control circuit 38, when the switch assembly 27 is in the form of a Triac, controls the Triac in response to the fault and latching signals. Thus, if the switch control circuit 38 does not receive an enabling signal in the manner previously described or if a fault signal is present at its input 39, then the switch control circuit 38 will cause the Triac 27 to open thereby disconnecting the A.C. power source 23 from the appliance 11 and protecting the operator of the appliance.

The fault detector circuit 32 includes apparatus which when a current imbalance occurs above a certain threshold provides the fault signal to input terminal 39 of the switch control circuit 38.

The automatic reset means 54 in FIG. 1 includes circuitry which when A.C. power is removed resets the latch and requires the operator to reapply power and contact the touch plate to enable the latch again.

Figure 2:
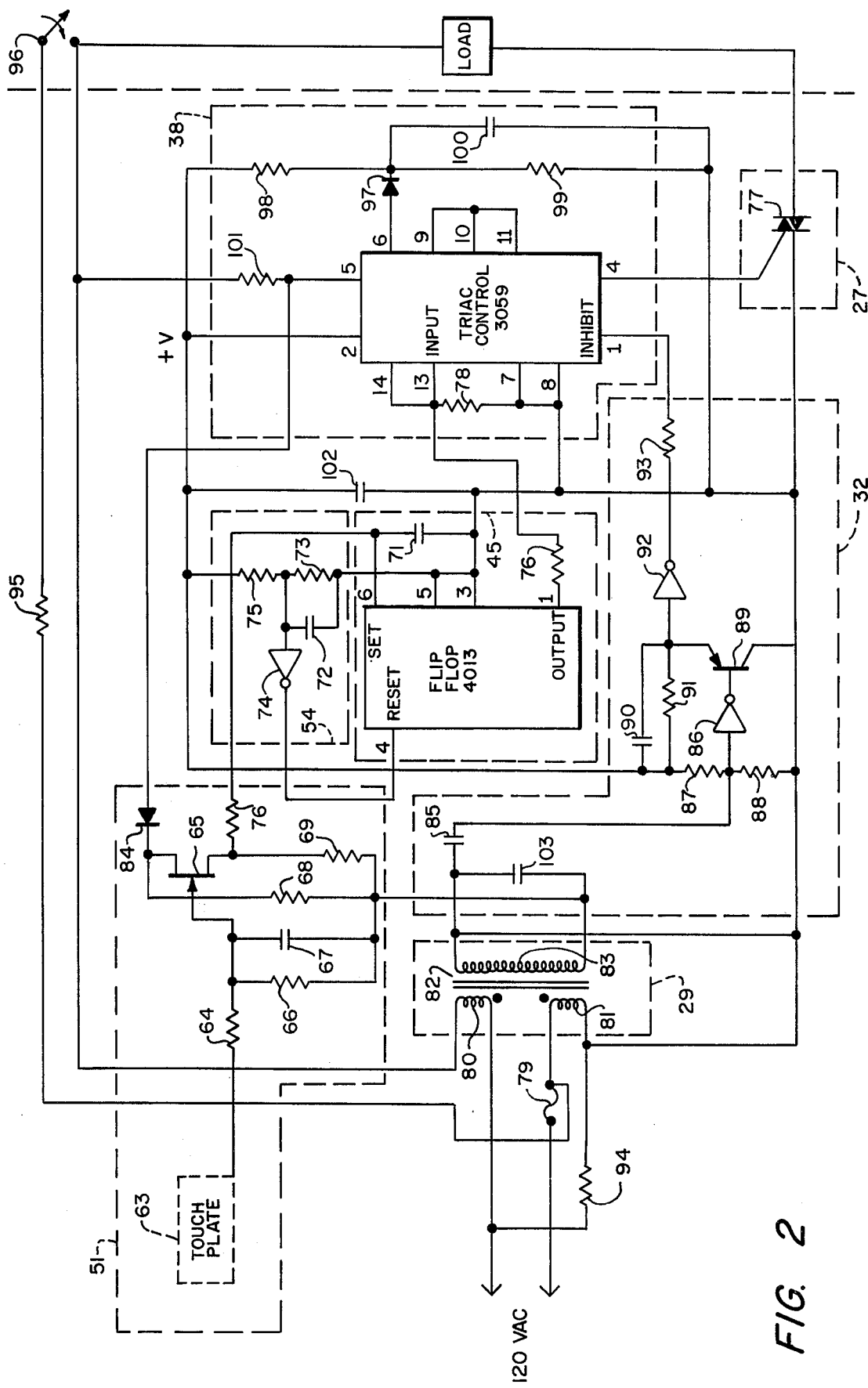
FIG. 2 is a schematic representation of an embodiment of the ground fault circuit interrupter system, in accordance with this invention.

Referring now to FIG. 2, touch plate 63 is preferably positioned in the plug assembly 14 in a manner such that the operator touches this contact while plugging in the associated appliance. The touch plate 63 is electrically coupled to resistor 64 which serves to isolate the operator from any internal voltages. Resistor 64 is in turn electrically connected to the gate of transistor 65 as well as to one side of resistor 66 and capacitor 67. Resistor 64 in combination with capacitor 67 act as a filter to high frequency noise and to prevent damage to gate of transistor 65 due to static electricity. Resistor 66 acts as a biasing resistor for transistor 65 and also references this amplifier to the Triac side of the line.

Resistor 68 is electrically connected across the series combination of transistor 65 and resistor 69. Also electrically connected between transistor 65 and terminal 5 of an integrated circuit CA 3059 hereinafter referred to as Triac Control 3059 manufactured by R.C.A. is diode 84. Diode 84 and resistor 68 provide a half wave rectified 60 hertz voltage to transistor 65.

Transistor 65 and resistor 69 form a source follower in which in turn provides a high input impedance and a low output impedance. This allows the transfer of the high impedance touch signal to a low pass filter formed by resistor 70 and capacitor 71 electrically connected in series between the transistor 65 and terminal 3 of flip flop integrated circuit CA 4013 hereinafter referred to as flip flop 4013 manufactured by R.C.A. Once capacitor 71 is charged, this signal sets flip flop 4013, giving a high output at output terminal 1.

Each time the plug assembly unit is unplugged from the A.C. source, capacitor 72 which is connected in parallel with resistor 73 at the input to inverter 74 is discharged through resistor 73. When the plug assembly unit is plugged into the A.C. source, capacitor 72 is initially discharged providing a low signal to inverter 74 which is electrically coupled at its output to the output terminal 4 of flip flop 4013. When the low signal is provided to inverter 74 it in turn provides a high signal to reset terminal 4 of flip flop 4013 which resets its output terminal 1 to the low state. Resistor 75 which is electrically connected to the input of inverter 74 charges capacitor 72 which sequences through removing the reset signal. This circuit then awaits a set signal and once set remains set until unplugged.

The output terminal 1 of flip flop 4013 provides a high signal to terminals 13 and 14 of Triac Control 3059 through resistor 76 which does the necessary signal conditioning to turn on the Triac 77 through output terminal 4 of the Triac Control 3059. Resistor 76 and resistor 78 electrically connected between terminals 13 and 7 of Triac Control 3059 provide the level conditioning for proper activation of Triac Control 3059.

The input line current from an A.C. source (not shown) goes through fuse 79 and primary windings 80 and 81 of transformer 82. The windings 80 and 81 are wound such that if the current coming from the hot side of the input line through winding 81 equals the current return through winding 82 to the neutral side of the line, these signals cancel and there is no output from the secondary winding 83 of the transformer 82. If some of the current from the hot side were bypassed to ground and did not return through winding 80 to the neutral line, this imbalance would cause a voltage to be induced through the secondary winding 83 of transformer 82. Capacitor 103 connected across secondary winding 83 filters any noise signals from the A.C. line.

A suitable differential transformer for a 6 ampere load can be made with a double E ferrite core. The primary windings placed in a single layer-over a 4500 turn secondary of ga. 44 wire are made with four turns of a cable of four strands of ga. 23 wire twisted tightly. One pair of strands is winding 80 and the remaining pair is winding 81.

Capacitor 85 electrically connected between one side of the secondary winding 83 of transformer 82 and the input of inverter 86 couples this A.C. signal from the secondary 83 to the inverter 86. Resistors 87 and 88 bias the input of inverter 86 for maximum sensitivity to small A.C. signals.

Transistor 89 electrically coupled to the output of inverter 86 buffers the output of inverter 86 to provide sufficient drive to charge capacitor 90 which with parallel resistor 91 form a time constant which holds the output of the inverter 92, connected in series with the parallel combination of resistor 91 and capacitor 90, high for a prescribed time after each fault signal is received. The output of inverter 92 is current limited by resistor 93 and activates the inhibit input terminal 1 of Triac Control 3059 thereby turning off the Triac 77.

Resistors 94 and 95 are synthetic faults which provide counter-balanced current bypass paths. With switch 96 open, only resistor 94 is bypassing current and therefore a fault signal is provided which keeps Triac 77 off. With switch 96 closed, resistor 95 provides a counter imbalance which cancels the fault signal and allows the Triac to turn on.

Diode 97, resistors 98 and 99, and capacitor 100 provide a temporary inhibit signal to assure that the Triac 77 is off during power up.

Resistor 101 and capacitor 102 are external components required for the power supply portion of Triac Control 3059.

Integrated circuit 3059 is more fully described in R.C.A. Handbook SSD-201C, 1975, Pages 297 through 304, the disclosure of which is incorporated herein by reference. Likewise, integrated circuit 4013, which is a Dual "D" type flip flop is more fully described in R.C.A. Handbook SSD-203C, 1975, Pages 70 through 75, the disclosure of which incorporated herein by reference.

---

The components of FIG. 2 are as follows:
Transformer 82 - Ferroxcube 813E343-3E2A
Transistor 65 - 2N4339
Transistor 89 - 2N3906
Triac 77 - R.C.A. T2800B
Inverter 74 - R.C.A. CD4069
Inverter 86 - R.C.A. CD4069
Inverter 92 - R.C.A. CD4069
Diode 84 - IN4148
Diode 97 - IN4148

| Resistor | | | | | |
|---|---|---|---|---|---|
| 64 | 22M ¼w | 75 | 500K ¼w | 93 | 10K ¼w |
| 66 | 2.2M ¼w | 76 | 5K ¼w | 94 | 33K 1w |
| 68 | 33K ¼w | 78 | 25K ¼w | 95 | 33K 1w |
| 69 | 100K ¼w | 87 | 22M ¼w | 98 | 90K ¼w |
| 70 | 5K ¼w | 88 | 10M ¼w | 99 | 100K ¼w |
| 73 | 5M ¼w | 91 | 22M ¼w | 101 | 10K 5w |

Capacitor 67 - 150pf 50v
71 - 15mf 10v
72 - 1mf 10v
85 - .47mf 15v
90 - .68mf 10v
100 - 10mf 10v
102 - 100mf 10v
103 - .068mf 1kv
Fuse 79 - 6A
Switch 96 - SPST 10A 120v A.C.

---

While an embodiment and application of the invention has been shown and described, it will be apparent to those skilled in the art that many more modifications are possible without departing from the inventive concepts herein described. The invention, therefore, is not to be restricted except as necessary by the prior art and by the spirit of the appended claims.

What is claimed as new and desired to be secured by Letters Patent of the United States is:

1. In a circuit for protecting the operator of a portable apparatus having an electrical load from an alternating current source having line and neutral conductor sides, circuit means capable of being electrically coupled between the alternating current source and the electrical load for sensing a current imbalance in the line and neutral conductor sides and developing an output signal in response to the current imbalance, switching means for interrupting the current in the line conductor side in response to said output signal, the improvement comprising:

polarity sensing means for indicating if said switching means is electrically connected in series in the line conductor side when said circuit means is electrically connected to the alternating current source and means for permanently connecting the electrical load in series in a completed circuit with the switching means wherein the switching means is a solid state switch adapted to self-destruct prior to a lethal voltage developing across said permanently connected electrical load.

2. In the circuit as in claim 1 wherein said solid state switch is a Triac.

3. In the circuit as in claim 1 wherein the switching means is a solid state switch and further including a thermal fuse electrically connected in series between said solid state switch and the electrical load, said thermal fuse adapted to self-destruct prior to a lethal voltage developing across said permanently connected electrical load.

4. In the circuit as in claim 3 wherein said solid state switch is a Triac.

5. In the circuit as in claim 1 wherein said polarity sensing means includes a comparator means having a first and second input and an output.

6. In the circuit as in claim 5 further including a reference means electrically connected to said first input of said comparator means for applying a reference signal to said first input of said comparator means and means for electrically connecting said second input of said comparator means to said line conductor side thereby resulting in an output signal proportional to the difference between the reference signal and the signal from the line conductor side.

7. In the circuit as in claim 1 wherein said reference means includes a conductive touch plate for transferring signals from the body of the operator to said first input of said comparator means.

8. In the circuit as in claim 5 further including a reference means electrically connected to said first input of said comparator means for applying a reference signal to said first input of said comparator means and means for electrically connecting said second input of said comparator means to said neutral conductor side thereby resulting in an output signal proportional to the difference between the reference signal and the signal from the neutral conductor side.

9. In a circuit for protecting the operator of a portable apparatus having an electrical load from an alternating current source having line and neutral conductor sides, circuit means capable of being electrically coupled between the alternating current source and the electrical load for sensing a current imbalance in the line and neutral conductor sides and developing an output signal in response to the current imbalance, switching means for interrupting the current in the line conductor side in response to said output signal, the improvement comprising:

polarity sensing means for indicating if said switching means is electrically connected in series in the line conductor side when said circuit means is electrically connected to the alternating current source wherein said polarity sensing means includes a comparator means having a first and second input and an output and further including a reference means electrically connected to said first input of said comparator means for applying a reference signal to said first input of said comparator means and means for electrically connecting said second input of said comparator means to said line conductor side thereby resulting in an output signal proportional to the difference between the reference signal and the signal from the line conductor side wherein said reference means includes a conductive touch plate for transferring signals from the body of the operator to said first input of said comparator means and wherein said comparator means is a high input impedance amplifier.

10. In a circuit for protecting the operator of a portable apparatus having an electrical load from an alternating current source having line and neutral conductor sides, circuit means capable of being electrically coupled between the alternating current source and the electrical load for sensing a current imbalance in the line and neutral conductor sides and developing an output signal in response to the current imbalance, switching means for interrupting the current in the line conductor side in response to said output signal, the improvement comprising:

polarity sensing means for indicating if said switching means is electrically connected in series in the line conductor side when said circuit means is electrically connected to the alternating current source wherein said polarity sensing means includes a comparator means having a first and second input and an output and further including a reference means electrically connected to said first input of said comparator means for applying a reference signal to said first input of said comparator means and means for electrically connecting said second input of said comparator means to said line conductor side thereby resulting in an output signal proportional to the difference between the reference signal and the signal from the line conductor side wherein said reference means includes a conductive touch plate for transferring signals from the body of the operator to said first input of said comparator means and wherein said switching means is a Triac and wherein said circuit means includes a latching circuit electrically connected at an input terminal to said output of said comparator means wherein said latching circuit is activated when a predetermined signal is applied to said input terminal of said latching circuit thereby enabling said Triac.

11. In the circuit as in claim 10 further including a switching control circuit having a first input terminal electrically connected to said output of said latching circuit and a second input terminal electrically connected to said output signal developed by said means for sensing current imbalance and causing said Triac to open when appropriate signals appear at said first and second input terminals of said switching control circuit.

12. A ground fault circuit interrupter unit comprising:

a housing;

circuit means disposed in said housing and include a semiconductor switching member for electrically disconnecting power to an electrical load when a current imbalance occurs in said circuit means;

means extending through said housing for readily releasably connecting a source of A.C. power having line and neutral conductors to said circuit means;

means for electrically connecting said circuit means to the electrical load;

polarity sensing means for indicating if said semiconductor switching member is electrically connected in series between the line conductor of the source A.C. power and the electrical load; and means for enabling said semiconductor switching member when said switching member is electrically connected in series with the line conductor.

13. The ground fault circuit interrupter unit as in claim 12 wherein said semiconductor member is a Triac permanently connected to the electrical load.

14. The ground fault circuit interrupter unit as in claim 7 wherein said means extending through said housing include first and second plug blades.

15. In an apparatus having an electrical load and an on/off switch, a protective circuit comprising:

plug means having first and second blade means for temporarily electrically connecting the electrical load to a source of alternating current having a neutral conductor and a line conductor, said first blade means suitable for electrically connecting the line conductor to a first side of the electrical load and said second blade means suitable for electrically connecting the neutral conductor to a second side of the electrical load;

means for sensing current imbalance in the line and neutral conductors and developing an output signal in response to the current imbalance;

solid state switching means electrically connected in a series in a completed circuit between said first blade means and the first side of the electrical load for interrupting the current between said first blade means and the first side of the electrical load in response to said output signal; and enabling means for enabling said solid state switching means when said switching means is electrically connected in series with the line conductor.

16. In the apparatus as in claim 14 further including means for introducing a synthetic fault signal electrically connected between the second blade means and said solid state switching means and means for introducing a counterbalancing synthetic fault signal when said on/off switch is in the on position electrically connected between a first side of the on/off switch and said first blade means.

17. In the apparatus as in claim 15 further including polarity sensing means for visually indicating that said solid state switching means is electrically connected in series with the line conductor.

18. In the apparatus as in claim 17 further including polarity sensing means for visually indicating if said solid state switching means is electrically connected in series with the line conductor.

* * * * *